(12) United States Patent
Hasty et al.

(10) Patent No.: US 7,796,632 B2
(45) Date of Patent: Sep. 14, 2010

(54) TRANSMISSION CHANNEL BANDWIDTH SELECTION FOR COMMUNICATIONS BETWEEN MULTI-BANDWIDTH NODES

(75) Inventors: William V. Hasty, Lake Mary, FL (US);
Surong Zeng, Schaumburg, IL (US);
Sebnem Zorlu Ozer, Plainsboro, NJ (US)

(73) Assignee: Motorola, Inc., Schaumburg, IL (US)

( * ) Notice: Subject to any disclaimer, the term of this patent is extended or adjusted under 35 U.S.C. 154(b) by 854 days.

(21) Appl. No.: 11/537,093

(22) Filed: Sep. 29, 2006

(65) Prior Publication Data
US 2008/0080553 A1   Apr. 3, 2008

(51) Int. Cl.
*H04L 12/28* (2006.01)
(52) U.S. Cl. ..................................... 370/431
(58) Field of Classification Search .............. 370/468, 370/431
See application file for complete search history.

(56) References Cited
U.S. PATENT DOCUMENTS

| | | | | |
|---|---|---|---|---|
| 5,065,399 A | * | 11/1991 | Hasegawa et al. | 714/4 |
| 5,726,978 A | * | 3/1998 | Frodigh et al. | 370/252 |
| 6,031,845 A | * | 2/2000 | Walding | 370/468 |
| 6,748,005 B1 | * | 6/2004 | Riazi et al. | 375/133 |
| 7,069,014 B1 | * | 6/2006 | Thenthiruperai et al. | 455/452.2 |
| 7,269,153 B1 | * | 9/2007 | Schultz et al. | 370/338 |
| 2004/0052273 A1 | * | 3/2004 | Karaoguz et al. | 370/465 |
| 2004/0202124 A1 | * | 10/2004 | Dick et al. | 370/329 |
| 2006/0140147 A1 | * | 6/2006 | Van Bemmel | 370/329 |
| 2006/0165114 A1 | * | 7/2006 | Diepstraten et al. | 370/445 |

OTHER PUBLICATIONS

PCT Preliminary Report on Patentability Dated Apr. 9, 2009.
PCT Search Report Dated Apr. 17, 2008.

* cited by examiner

*Primary Examiner*—Derrick W Ferris
*Assistant Examiner*—Mang Yeung
(74) *Attorney, Agent, or Firm*—Randi L. Karpinia (57) ABSTRACT

Techniques and technologies are provided for dynamically selecting one of a default channel bandwidth and an alternate channel bandwidth for transmitting information over a wireless communication link which couples a transmitter node to a receiver node. The transmitter node and the receiver node are designed to transmit and receive at the default channel bandwidth and at the alternate channel bandwidth.

21 Claims, 6 Drawing Sheets

TRANSMISSION CHANNEL BANDWIDTH SELECTION FOR COMMUNICATIONS BETWEEN MULTI-BANDWIDTH NODES

FIELD OF THE INVENTION

The present invention relates generally to communications and more particularly to techniques for selecting a channel bandwidth for communicating data between nodes in a wireless communication network.

BACKGROUND

Wireless networks have experienced increased development in the past decades. Two types of wireless networks are infrastructure-based wireless networks and ad hoc networks. An infrastructure-based wireless network typically includes a communication network with fixed and wired gateways. Many infrastructure-based wireless networks employ a mobile unit which communicates with a base station that is coupled to a wired network. The mobile unit can move geographically wile it is communicating over a wireless link to the fixed base station. When the mobile unit moves out of range of one base station, it may connect or perform a "handover" to a new base station and continue communicating with the wired network though the new base station.

In comparison to infrastructure-based wireless networks, such as cellular networks, or satellite networks, ad hoc networks are self-forming networks which can operate in the absence of any fixed infrastructure, and in some cases the ad hoc network is formed entirely of wireless nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between nodes can change dynamically in an arbitrary manner as existing nodes leave or exit the ad hoc network.

Nodes in an ad hoc network can utilize a Request-to-Send (RTS)/Clear-to-Send (CTS) protocol to reduce frame collisions introduced by a hidden node problem. According to this protocol, a transmitter node wishing to send data can initiate the RTS/CTS protocol by transmitting a Request-to-Send (RTS) message. The RTS message can be a short frame (30 bytes) and may contain the duration of a CTS-Data-Ack exchange that may eventually follow. A receiver node replies with a Clear-to-Send (CTS) message. The CTS message can be a frame contains the remaining duration of the data-ACK exchange that may follow. Upon receipt of the CTS message the transmitter node begins transmission, and any other node receiving the CTS frame should refrain from sending data for a given time (solving the hidden node problem). The amount of time the node should wait before trying to get access to the medium is included in both the RTS message and the CTS message. Any other node receiving the RTS frame but not the CTS frame is permitted to transmit to other neighboring nodes (solving the exposed node problem). The RTS-CTS protocol was designed under the assumption that all nodes have the same transmission range.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to dynamically selecting a channel bandwidth for transmitting a data packet over a wireless communication link which couples a transmitter node to a receiver node. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions for dynamically selecting a channel bandwidth for transmitting a data packet over a wireless communication link which couples a transmitter node to a receiver node as described herein. The non-processor circuits may include, but are not limited to, a radio receiver, a radio transmitter, signal drivers, clock circuits, power source circuits, and user input devices. As such, these functions may be interpreted as steps of a method for dynamically selecting a channel bandwidth for transmitting a data packet over a wireless communication link which couples a transmitter node to a receiver node. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to generate such software instructions and programs and ICs with minimal experimentation.

In this document, relational terms such as first and second, front and last, beginning and end, and the like may be used solely to distinguish one entity or action from another entity or action without necessarily requiring or implying any actual such relationship or order between such entities or actions. The use of these relational terms and the like in the description and the claims may be used for distinguishing between similar elements and not necessarily for describing a particular sequential or chronological order. It is to be understood that the terms so used are interchangeable under appropriate circumstances such that the embodiments of the invention described herein are, for example, designed to operate in sequences other than those illustrated or otherwise described herein.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Exemplary Communication Network

Figure 1:
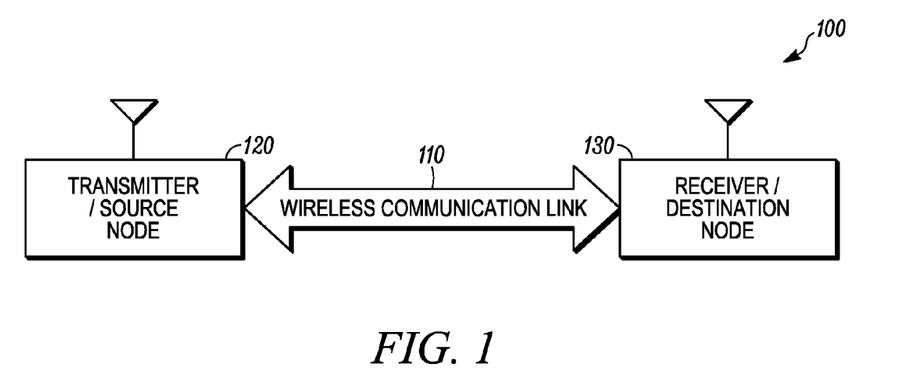
FIG. 1 is a block diagram of an exemplary communication network.

FIG. 1 is a block diagram of an exemplary communication network 100 which comprises a source node 120 and a destination node 130 which communicate with one another over a link or channel 110. The link 110 can be wired or wireless. The receiver/destination node 130 is assumed to be within communication range of the transmitter/source node 120. The nodes 120, 130 can generally be devices designed to receive packetized audio, video and/or data information. The nodes can exchange information as data packets transmitted over one or more communication channels. Some of the components in an exemplary node, such as an exemplary processor, transmitter, receiver and antenna, are described below with reference to FIG. 2. In one implementation, the source node 120 and destination node 130 can be nodes in a wireless network (e.g., a communication device and base station or vice-versa) and can communicate information packets over a communication medium in accordance with a multiple access scheme. Alternatively, in another implementation, the source node 120 and destination node 130 can be nodes in an ad hoc communication network where the nodes each have repeater and routing capability.

As used herein, the term "transmitter/source node 120" is defined to be the source of the transmission, not necessarily the source of a particular packet. As used herein, the term "receiver/destination node 130" is defined to be the destination for the transmission, not necessarily the final destination for a particular packet. The term "receiver/destination node 130" can refer to a neighbor node or a next hop node from the transmitter/source node 120. In some situations, the receiver/destination node 330 can be the actual destination of a packet transmitted from the transmitter/source node 120.

Overview

In some operating environments (e.g., in outdoor urban environments), channel quality of the communication link between the transmitter and receiver nodes can vary considerably. Depending on the delay spread conditions, in some cases it is beneficial for nodes belonging to a particular network to use a relatively narrow channel bandwidth if the delay spread conditions are particularly bad. For example, an IEEE 802.11 network which operates on a single 10 MHz channel in the 4.9 GHz public safety band has proven to be a useful configuration to deal with harsh delay spread conditions which can occur in some channels in outdoor urban environments.

It would be desirable to provide a wireless network (e.g., ad hoc network or other wireless network) comprising multi-bandwidth nodes which are designed to communicate at alternate channel bandwidths depending on integrity and quality of the channel or link between two nodes. For instance, it would be desirable to increase the channel bandwidth in some cases and decrease the channel bandwidth in other cases.

Techniques and technologies are described herein for allowing each node in a wireless network (e.g., ad hoc network or other wireless network) to select its desired transmission bandwidth for each data frame in a dynamic fashion. These techniques and technologies can be used, for example, to dynamically select one of a default channel bandwidth and a alternate channel bandwidth for transmitting a packet over a wireless communication link which couples a multi-bandwidth transmitter node to a multi-bandwidth receiver node in a wireless network (e.g., ad hoc network or other wireless network). In one implementation, each node can dynamically select one of a default channel bandwidth, a higher channel bandwidth and a lower channel bandwidth for transmitting a data packet over a wireless communication link which couples a transmitter (or source) node to a receiver (or destination) node in an ad hoc network. For instance, applying these techniques and technologies to the exemplary network 100 shown in FIG. 1, the transmitter/source node 120 and the receiver/destination node 130 can transmit and receive at a default channel bandwidth (e.g., 10 MHz) and at least one of or each of a second channel of higher channel bandwidth (e.g., 20 MHz), a third channel of lower channel bandwidth (e.g., 5 MHz), and the like. These techniques and technologies provide a way to dynamically use higher or lower bandwidth channels for communication in situations where links will likely not be adversely affected by the harshest delay spread conditions, while also maintaining Media Access Control (MAC) integrity and not violating air interface standards.

Figure 2:
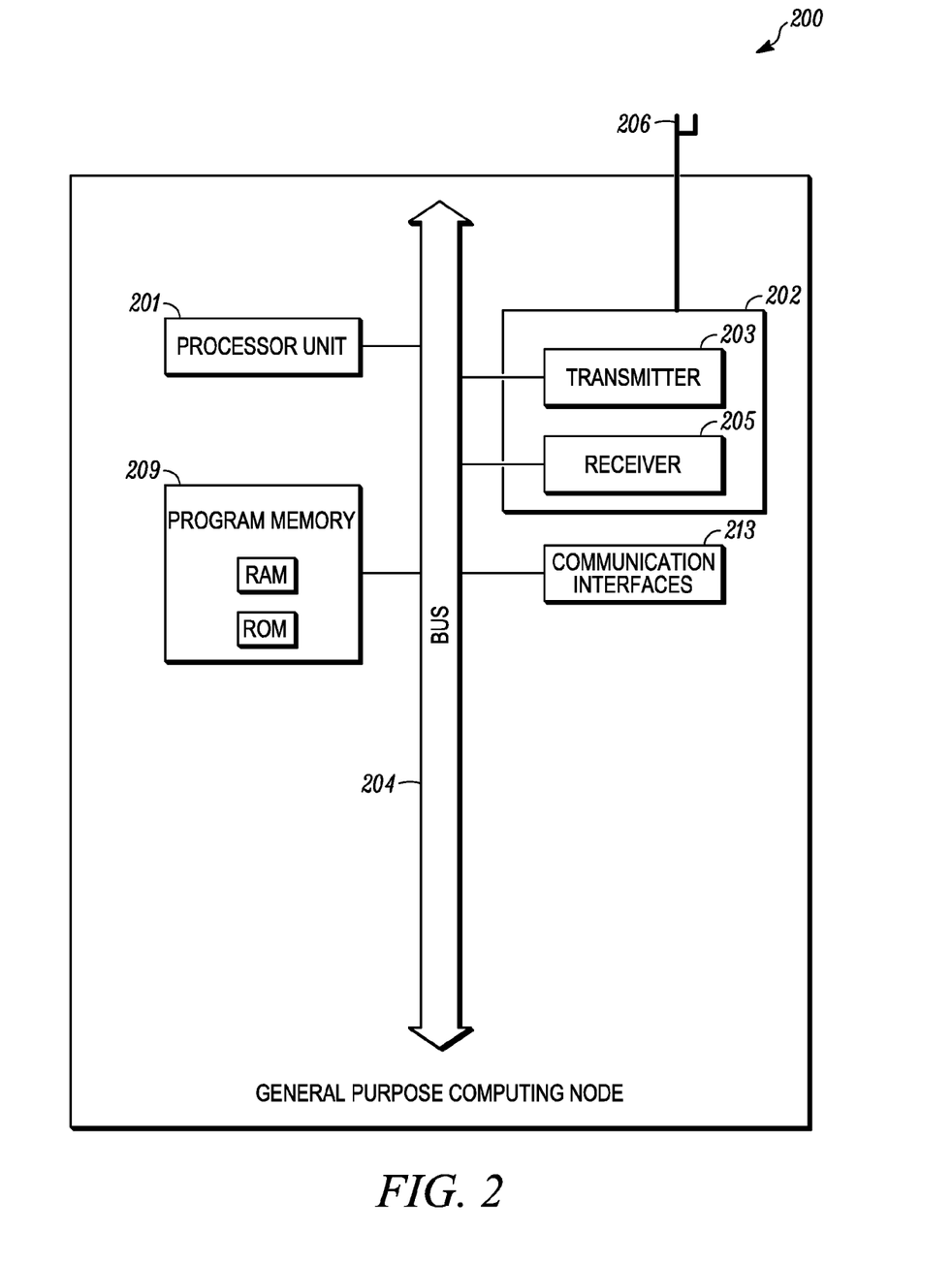
FIG. 2 is a block diagram of an exemplary general purpose computing node.

Before further describing exemplary implementations of the invention, a brief overview of some conceptual components in a node will be provided with reference to FIG. 2.

FIG. 2 is a block diagram of an exemplary multi-bandwidth node 200 in accordance with some embodiments of the invention. The node 200 comprises a processor 201, a transceiver 202 including a transmitter circuitry 203 and a receiver circuitry 205, an antenna 206, a program memory 209 for storing operating instructions that are executed by the processor 201, and one or more communication interfaces 213. Although not shown, the node 200 also can include an antenna switch, duplexer, circulator, or other highly isolative means (not shown) for intermittently providing information packets from the transmitter circuitry 203 to the antenna 206 and from the antenna 206 to the receiver circuitry 205. The node 200 can be, for example, an integrated unit containing at least all the elements depicted in FIG. 2, as well as any other elements necessary for the node 200 to perform its particular functions. Alternatively, the node 200 can comprise a collection of appropriately interconnected units or devices as is well known in the art, wherein such units or devices perform functions that are equivalent to the functions performed by the elements of the node 200. For example, the node 200 can comprise a laptop computer and a LAN (local area network) card.

The processor 201 includes one or more microprocessors, microcontrollers, DSPs (digital signal processors), state machines, logic circuitry, or any other device or devices that process information based on operational or programming instructions. Such operational or programming instructions are stored in the program memory 209. The program memory 209 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the node 200 are described in detail below.

The antenna 206 comprises any known or developed structure for radiating and receiving electromagnetic energy in the frequency range containing the carrier frequencies.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a communication channel.

The implementations of the transmitter circuitry 203 and the receiver circuitry 205 depend on the implementation of the node 200. For example, the transmitter circuitry 203 and the receiver circuitry 205 can be implemented as an appropriate modem, or as conventional transmitting and receiving components of two-way communication devices. When the transmitter circuitry 203 and the receiver circuitry 205 are implemented as a modem, the modem can be internal to the node 200 or operationally connectable to the node 200 (e.g., embodied in a radio frequency (RF) modem implemented on a Personal Computer Memory Card International Association (PCMCIA) card). For a communication device, the transmitter circuitry 203 and the receiver circuitry 205 are preferably implemented as part of the device hardware and software architecture in accordance with known techniques. Most, if not all, of the functions of the transmitter circuitry 203 and/or the receiver circuitry 205 may be implemented in a processor, such as the processor 201. It will be appreciated, however, that the processor 201, the transmitter circuitry 203, and the receiver circuitry 205 have been artificially partitioned herein to facilitate a better understanding.

The receiver circuitry 205 is designed to receive wired or wireless signals within multiple frequency bandwidths. The receiver circuitry 205 may optionally comprise a first receiver and a second receiver, or one receiver designed to receive in two or more bandwidths. The transceiver 202 includes at least one set of transmitter circuitry 203. At least one transmitter 203 may be designed to transmit to multiple devices on multiple frequency bands. As with the receiver 205, dual or multiple transmitters 203 may optionally be employed.

As such, the multi-bandwidth node 200 can communicate with other multi-bandwidth node(s) at alternate channel bandwidths. The node 200 can dynamically select, for example, one of a default channel bandwidth and a alternate channel bandwidth (e.g., a higher channel bandwidth or a lower channel bandwidth) for transmitting a data packet over a wireless communication link which couples the node 200 to a receiver (or destination) node in a wireless network (e.g., ad hoc network or other wireless network). The node 200 is designed to transmit/receiving at the default channel bandwidth and the alternate channel bandwidth (e.g., a higher channel bandwidth or a lower channel bandwidth). For instance, with reference to the exemplary network 100 shown in FIG. 1, the transmitter/source node 120 and the receiver/destination node 130 can transmit and receive at a default channel bandwidth (e.g., 10 MHz) and a alternate channel bandwidth (e.g., other than 10 MHz). In one exemplary implementation, the alternate channel bandwidth may comprise at least one of a higher channel bandwidth (e.g., 20 MHz) and a lower channel bandwidth (e.g., 5 MHz), etc.

The processor 201 in the transmitter/source node 120 can dynamically select one of the default channel bandwidth and the alternate channel bandwidth (e.g., higher and lower channel bandwidths) for transmitting a data packet over a wireless communication link 110 to the receiver/destination node 130. A transmitter 203 in the transmitter/source node 120 can transmit a request message, for example, at the default channel bandwidth. In one implementation, the request message can be implemented using, for example, a Request-to-Send (RTS) message. The request message comprises a "requested channel bandwidth" which the transmitter/source node 120 is requesting to use for transmitting the data packet to the receiver/destination node 130. The requested channel bandwidth may comprise, for example, one of the default channel bandwidth and the alternate channel bandwidths (e.g., higher and lower channel bandwidths).

In the receiver/destination node 130, a receiver 205 can receive the request message from the transmitter/source node 120. A processor 201 in the receiver/destination node 130 can inspect the request message to determine the requested channel bandwidth (which the transmitter/source node 120 requests to use for transmitting the data packet to the receiver/destination node 130 over the wireless communication link 110), determine which channel bandwidths the receiver/destination node 130 supports, and dynamically select the default channel bandwidth or alternate channel bandwidth it wants to use in communicating information (e.g., data packet(s)) with the transmitter/source node 120. A transmitter 203 in the receiver/destination node 130 can then transmit a response message, for example, at the default channel bandwidth. In one implementation, the response message can be implemented using, for example, a Clear-to-Send (CTS) message. The response message may comprise either an acknowledgement indicator or a denial indicator. The acknowledgement indicator confirms that the channel bandwidth requested by the transmitter/source node 120 is available to transmit information to the receiver/destination node 130. In one implementation, the acknowledgement indicator can be implemented using an acknowledgement (ACK) message. The denial indicator indicates that the channel bandwidth requested by the transmitter/source node 120 is not available to transmit to the receiver/destination node 130. In one implementation, the denial indicator can be implemented using a negative acknowledgement (NACK) message.

Figure 3:
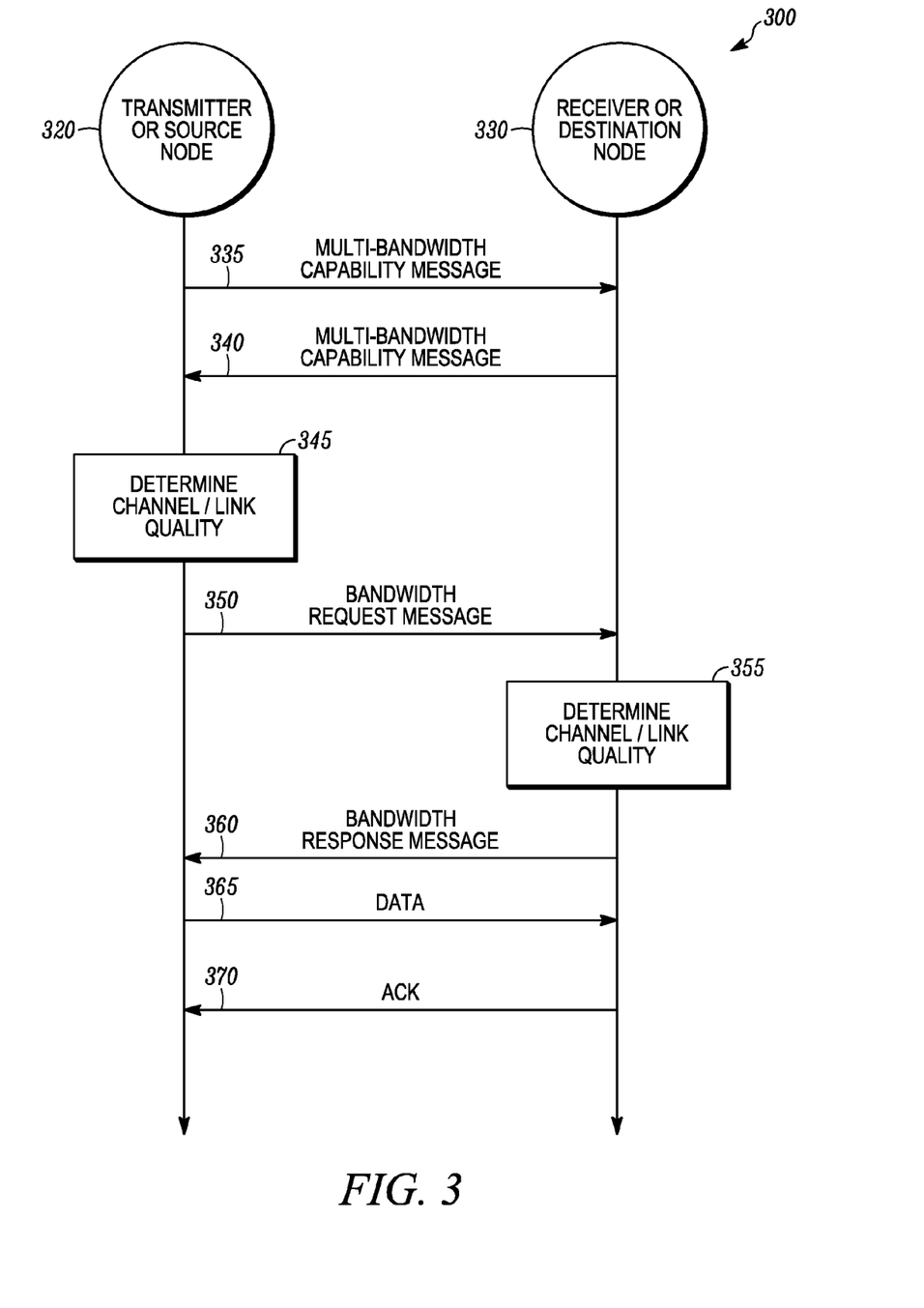
FIG. 3 is a message flow diagram showing messages exchanged between a transmitter/source node and a receiver/destination node according to one exemplary implementation of the present invention.

FIG. 3 is a message flow diagram 300 showing messages exchanged between a multi-bandwidth transmitter/source node 320 and a multi-bandwidth receiver/destination node 330 when dynamically selecting a channel bandwidth for transmitting information (e.g., a data packet) and for receiving other information (e.g., an ACK packet) over a wireless communication link (not shown in FIG. 3) which couples the multi-bandwidth transmitter/source node 320 to the multi-bandwidth receiver/destination 330. The transmitter/source node 320 and the receiver/destination node 330 designed to transmit/receiving at a default channel bandwidth (e.g., 10 MHz) and at one or more other channel bandwidths.

In one exemplary implementation that will be described below with reference to FIG. 3, the requested channel bandwidth comprises one of a default channel bandwidth, a higher channel bandwidth (e.g., 20 MHz) or a lower channel bandwidth (e.g., 5 MHz). It will be appreciated by those skilled in the art, however, that any number of other alternative channel bandwidths could be utilized depending upon the particular implementation, and moreover, that multiple different higher channel bandwidths could be utilized depending upon the particular implementation. In other words, in addition to the default channel bandwidth, a multi-bandwidth node could transmit/receive at two or more different higher channel bandwidths and at two or more different lower channel bandwidths (depending upon the particular implementation).

During the discovery exchange (e.g., beacon receipt or probe response), at communication 335, the transmitter/source node 320 can transmit a capability message to other nodes in the wireless network (e.g., ad hoc network or other wireless network) including the receiver/destination node 330, and at communication 340, the receiver/destination node 330 can also transmit a capability message to the transmitter/source node 320 and any other nodes in the wireless network. The capability message indicates that the transmitter/source node 320 is designed to transmit/receiving at a plurality of alternate channel bandwidths. In one particular exemplary implementation, the alternate channel bandwidths can include, for example, a default channel bandwidth (e.g., 10 MHz), a higher channel bandwidth (e.g., 20 MHz), and a lower channel bandwidth (e.g., 5 MHz).

In one exemplary implementation, each node that is capable of multi-channel operation (e.g., 5, 10 and 20 MHz channel operation) implements the capability message using a multi-channel bandwidth information element (IE). This IE comprises information about each supported dynamic channel bandwidth (e.g., 5 MHz, 10 MHz and 20 MHz). The transceiver 202 transmitting or receiving the Channel Bandwidth IE is able to dynamically switch channel bandwidth within a Short InterFrame Spacing (SIFS) period or duration.

At communication 345, the transmitter/source node 320 can determine the quality of its communication link with the receiver/destination node 330. As used herein, the term "quality of the communication link" refers to a measure of the probability that a transmitted packet will be successfully received at the intended receiver. The quality of the communication link can be determined or measured based on metrics such as channel quality measurements (CQMs) and channel quality statistics (CQSs), or an equivalent metric. The CQMs can be made during the reception, demodulation, and/or decoding of the message packet. The CQMs can include, for example, a received signal strength indicator (RSSI) value provided for each respective link, a received sensitivity (RS) value of the receiving node receiving the data packets, a transmitted power level (TPL) (in Decibels (Dbm)) at which the respective data packets were transmitted by the transmitting node over the respective links (e.g., the power level at which the node finds it necessary to transmit a data-packet over the link), and any other CQMs used to determine channel or link quality. The RSSI at which a data-packet is received by a node over a link is available from the physical layer. Also, each node knows its receive sensitivity (RS), which is the lowest level signal strength at which a received signal containing a data packet can be received in order for the node to be able to successfully recover data from the received data packet. In other words, any signal received with a value less than the threshold RS value will be viewed as noise. The CQSs can include, for example, a bit-error rate (BER) estimate, a number and/or distribution in time of multipath signals present during demodulation, a post-detection signal quality (PDSQ) value, and an analog gain control (AGC) output. The BER estimate is based on the ratio of bit errors to packet length. The bit error count is obtained by encoding the decoder output symbols and comparing this sequence to the sequence of hard decisions made on the input symbols of a decoder. The error count is the number of symbol positions in which these two sequences differ. The BER is used in estimating the severity of interference or path loss affecting the communication link between the transmitter/source node and the receiver/destination node. The number of multipath signals can be estimated, for example, by the counting the number of taps employed by the equalizer within the modem. The number and distribution in time of multipath signals is used in estimating the link margin and the severity of the multipath. The PDSQ can be obtained, for example, from outputs of a correlator during demodulation and is used in estimating the link margin and the severity of the multipath or other interference. In one implementation, an automatic gain control (AGC) system can be used in estimating the total power of the received signal and the resulting link margin. In one implementation the observed RTS or data completion rate can be used to estimate the quality of the channel where the successful reception of a CTS following the transmission of the corresponding RTS frame constitutes success in the time allotted, and the successful reception of an ACK following the transmission of the corresponding data frame constitutes success in the time allotted.

In one exemplary implementation, feedback from a modem in the node or a rate control and link quality estimation algorithm can be used to determine link or channel quality. For instance, the modem feedback or the rate control and link quality estimation algorithm can be used to directly indicate that the delay spread conditions may allow successful 20 MHz channel bandwidth operation (e.g., that a 20 MHz data exchange is likely to succeed).

Upon determining the quality of its communication link with the receiver/destination node 330, the transmitter/source node 320 can select the requested channel bandwidth based on the quality of the communication link (as determined at the transmitter/source node 320). In one exemplary implementation, the requested channel bandwidth can be selected from one of the default, higher and lower channel bandwidths. In another implementation, the requested channel bandwidth comprises the highest channel bandwidth that is supported based on the quality of the communication link determined at the transmitter/source node 320.

At communication 350, the transmitter/source node 320 can transmit a request message to specify the requested channel bandwidth. The requested channel bandwidth is the channel bandwidth which the transmitter/source node 320 requests to use for transmitting information (e.g., data packet or other information) to the receiver/destination node 330. In one exemplary implementation, discussed below with reference to FIG. 4, the request message can be implemented within a Request-to-Send (RTS) message.

At communication 355, the receiver/destination node 330 can determine the quality of its communication link with the transmitter/source node 320, and then determine whether the requested channel bandwidth (requested by the transmitter/source node 320) is supported based on the quality of the communication link (as determined at the receiver/destination node 330). It will be appreciated that the message flow in FIG. 3 is not limiting, but merely shows one exemplary implementation. For example, the receiver/destination node 330 can determine the quality of its communication link with the transmitter/source node 320 at any time before or after the receiver/destination node 330 transmits the multi-bandwidth capability message. Moreover, the receiver/destination node 330 can determine the quality of its communication link with the transmitter/source node 320 at any time before or after the transmitter/source node 320 determines the quality of its communication link with the receiver/destination node 330.

Using the quality of the communication link (as determined at the receiver/destination node 330), at communication 360, the receiver/destination node 330 can then generate and transmit an appropriate response message to indicate whether the quality of the communication link determined at the receiver/destination node 330 supports the requested channel bandwidth. The response message can comprise, for example, an acknowledgement indicator or a denial indicator. The acknowledgement indicator can confirm that the channel bandwidth (requested by the transmitter/source node 320) is available to transmit information (e.g., data packet or other information) to the receiver/destination node 330. The denial indicator can indicate that the channel bandwidth requested by the transmitter/source node 320 is not available to transmit information to the receiver/destination node 330. In one exemplary implementation, the response message can specify the highest one of the default, higher and lower channel bandwidths that is supported by the quality of the communication link (as determined at the receiver/destination node 330). In one exemplary implementation, discussed below with reference to FIG. 5, the response message from the receiver/destination node 330 can be implemented within a Clear-to-Send (CTS) message. This CTS message can be transmitted at the default channel bandwidth.

At communication 365, the transmitter/source node 320 can send information (e.g., a data packet) to the receiver/destination node 330 at the appropriate channel bandwidth specified by the receiver/destination node 330. For instance, according to one exemplary scenario, when the receiver/destination node 330 determines that the quality of its communication link with the transmitter/source node 320 does not support channel bandwidths other than the default channel bandwidth, then the transmitter/source node 320 can transmit at the default channel bandwidth (e.g., 10 MHz). According to another exemplary scenario, when the receiver/destination node 330 determines that the quality of its communication link with the transmitter/source node 320 supports a higher channel bandwidth, then the transmitter/source node 320 can transmit at the higher channel bandwidth (e.g., 20 MHz).

According to yet another scenario, when the receiver/destination node 330 determines that the quality of its communication link with the transmitter/source node 320 only supports lower channel bandwidths, then the transmitter/source node 320 can transmit at the lower channel bandwidth (e.g., 5 MHz).

If the receiver/destination node 330 can successfully decode the information transmitted by the transmitter/source node 320, then at communication 370, the receiver/destination node 330 can send an acknowledgement (ACK) message to the transmitter/source node 320 at the appropriate or selected channel bandwidth specified by the transmitter/source node 320.

As noted above, in one exemplary implementation, the request message can be implemented using a Request-to-Send (RTS) message as will be described with reference to FIG. 4, and the response message can be implemented using a Clear-To-Send (CTS) message as will be described with reference to FIG. 5. The exemplary implementation described in FIGS. 4 and 5 describes the use of the method in conjunction with a frame structure that is known in the context of 802.11 standards. However, the method can be implemented in the context of frame structures used in other Carrier Sensing Multiple Access/Collision Avoidance (CSMA/CA) protocols (e.g., not just for 802.11 standards), for example, by designating a bandwidth selection field in the frame to identify the selected bandwidth or by using any combinations of available bits in the frame to identify the selected bandwidth.

Figure 4:
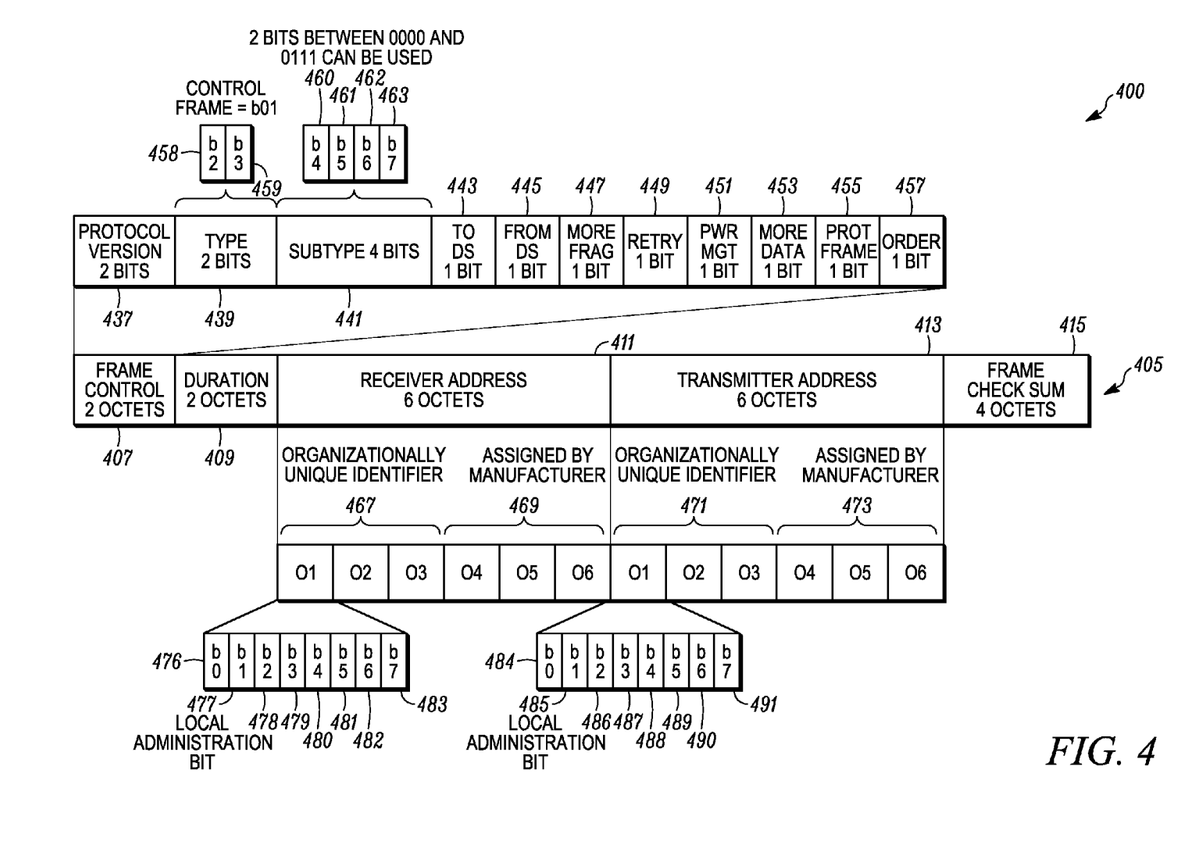
FIG. 4 is an exemplary frame structure of a Request-to-Send (RTS) message according to one exemplary implementation of the present invention.

FIG. 4 is an exemplary frame structure of a Request-to-Send (RTS) message 400 sent to a receiver/destination node 330 from a transmitter/source node 320 according to one exemplary implementation of the present invention. As shown in FIG. 4, the RTS message 400 comprises a number of fields 405. In this particular example, the fields 405 comprise a frame control field 407, a duration field 409, a receiver address field 411, a transmitter address field 413 and a frame checksum field 415, although these fields can vary depending on the specific implementation. The duration field 409 and the frame checksum field 415 each comprise a number of sub-fields (not shown), As these sub-fields are known in the art, for instance in the context of IEEE 802.11 standards, they will not be described in detail herein.

The frame control field 407 comprises a number of sub-fields. In this particular example, the sub-fields 435 comprise a protocol version sub-field 437, a type sub-field 439, a sub-type sub-field 441, and a number of other sub-fields 443-457, although the specific sub-fields can vary depending on the specific implementation. The sub-fields 437 and 443-457 are known in the art, for instance in the context of IEEE 802.11 standards, and therefore will not be described in detail herein. In an exemplary implementation, a pair of bits in the frame control field 407 can be used to indicate a particular channel bandwidth being requested by the transmitter/source node 320. For example, a first bit and a second bit in the frame control field 407 can each have a first value or a second value. In one exemplary implementation, setting the first bit to the first value and the second bit to the first value indicates that the transmitter/source node 320 is requesting to transmit the data packet over the wireless communication link at the default channel bandwidth, setting the first bit to the first value and the second bit to the second value indicates that the transmitter/source node 320 is requesting to transmit the data packet over the wireless communication link at the higher channel bandwidth, and setting the first bit to the second value and the second bit to the first value indicates that the transmitter/source node 320 is requesting to transmit the data packet over the wireless communication link at the lower channel bandwidth. For example, in one exemplary implementation, four bits 460-463 (labeled as b4, b5, b6, b7) within the sub-type sub-field 441 can be used to request a particular channel bandwidth.

For instance, two bits 458, 459 within the type sub-field 439 (labeled as b2, b3) are 0 and 1, respectively, to indicate that the frame 400 type is a control frame. Eight of the sixteen different combinations of the four bits 460-463 (labeled as b4, b5, b6, b7) within the sub-type sub-field 441 can be used to indicate the sub-type of the control frame 400 (e.g., 1011 is a RTS frame, 1100 is a CTS frame, 1101 is an acknowledgement (ACK) frame, etc.). In current IEEE 802.11 standards, the remaining eight of the bit combinations between 0000 and 0111 (e.g., 0000, 0001, 0010, 0100, 0011, 0101, 0110, 0111) are unassigned. The remaining eight of the bit combinations between 0000 and 0111 (e.g., 0000, 0001, 0010, 0100, 0011, 0101, 0110, 0111) can be used to request a particular channel bandwidth for a specific sub-type of control frame 400. For instance, if the frame sub-type indicates that the control frame 400 is a RTS type frame, then a particular specialized value (e.g., 0001, 0010) of the four bits 460-463 (labeled as b4, b5, b6, b7) of the sub-type field 441 can be used to specify an increase or a decrease of the channel bandwidth of that RTS control frame, whereas 1011 is used to specify the default channel bandwidth. Similarly, if the frame sub-type indicates that the control frame 400 is a CTS type control frame, then another particular specialized value (e.g., 0100, 0011) of the four bits 460-463 (labeled as b4, b5, b6, b7) of the sub-type field 441 can be used to specify an increase or a decrease of the channel bandwidth of that CTS frame, whereas 1100 is used to specify the default channel bandwidth. If the frame sub-type indicates that the control frame 400 is an ACK type frame, then a yet another specialized particular value (e.g., 0101, 0110) of the four bits 460-463 (labeled as b4, b5, b6, b7) of the sub-type field 441 can be used to specify an increase or a decrease of the channel bandwidth of that ACK frame, whereas 1101 is used to specify the default channel bandwidth.

Similarly, the transmitter address field 413 comprises a number of octets O1-O6. The octets O1-O3 can be used to designate an organizationally unique identifier (OUID) 471 associated with the transmitter node, whereas the octets O4-O6 can be used to designate a manufacturer identifier (MID) 473 associated with the transmitter node. The first octet (O1) comprises eight bits 484-491 which are labeled b0-b7. In this example, bit b1 485 is referred to as a local administration bit (LAB). The use of the LABs 477, 485 will be described in more detail below. Octets O2 through O6 are known in the art and will not be described in detail herein.

In one exemplary implementation, different bits in the transmitter address field 413 and the receiver address field 411 can be used to indicate a particular channel bandwidth being requested by the transmitter/source node 320. For example, a bit in the transmitter address field 413 and another bit in the receiver address field 411 may have either a first value or the second value. Setting these bits in the transmitter address field 413 and the receiver address field 411 to different combinations can be used to indicate a particular channel bandwidth being requested by the transmitter/source node 320. For instance, setting these bits to the first value can indicate that the transmitter/source node 320 is requesting to transmit the data packet over the wireless communication link at the default channel bandwidth, setting a bit in the transmitter address field 413 to the first value and a bit in the receiver address field 411 to the second value can indicate that the transmitter/source node 320 is requesting to transmit the data packet over the wireless communication link at the higher channel bandwidth, and setting a bit in the transmitter address field 413 to the second value and a bit in the receiver address field 411 to the first value can be used to indicate that the transmitter/source node 320 is requesting to transmit the data packet over the wireless communication link at the lower channel bandwidth.

In one exemplary implementation, different combinations of the locally administered bits (LABs) 477, 485 in the MAC address of the receiver/destination node 330 and in the MAC address of the transmitter/source node 320, respectively, can be used to request a channel bandwidth change down to a lower channel bandwidth (e.g., 5 MHz channel) or up to a higher channel bandwidth (e.g., 20 MHz channel) from the default channel bandwidth (e.g., 10 MHz channel) operation. Nodes that have not issued the Channel Bandwidth IE will not misinterpret the local administration bit (LAB) since those nodes only care about the duration value indicated in the control frame.

For example, when the transmitter/source node 320 has indicated support for multi-bandwidth operation via the Channel Bandwidth IE, and the transmitter/source node 320 transmits an RTS message 400, any other receiver/destination node 330 which also supports multi-bandwidth operation (and receives the RTS message 400), can interpret the local administration bits (LABs) in the RTS message to indicate requests for support of a particular channel bandwidth. For instance, in an implementation where the transmitter/source node 320 and receiver/destination node 330 support a default channel bandwidth of 10 MHz, a higher channel bandwidth of 20 MHz and a lower channel bandwidth of 5 MHz, the local administration bits (LABs) 477, 485 can be interpreted as follows: when the LABs 477, 485 are both set to logic 0, this represents a request for the default bandwidth (e.g., 10 MHz channel bandwidth request), when the LABs 477, 485 are set to logic 0 and 1, respectively, this represents a request for a higher bandwidth (e.g., a 20 MHz channel bandwidth request), and when the LABs 477, 485 are set to logic 1 and logic 0, respectively, this represents a request for a lower bandwidth (e.g., 5 MHz channel bandwidth request). Those skilled in the art will appreciate that different logic combinations of the LABs 477, 485 could be utilized to designate alternate channel bandwidth requests.

As noted above, in one exemplary implementation, the response message can be implemented using a Clear-to-Send (CTS) message as will now be described below with reference to FIG. 5.

Figure 5:
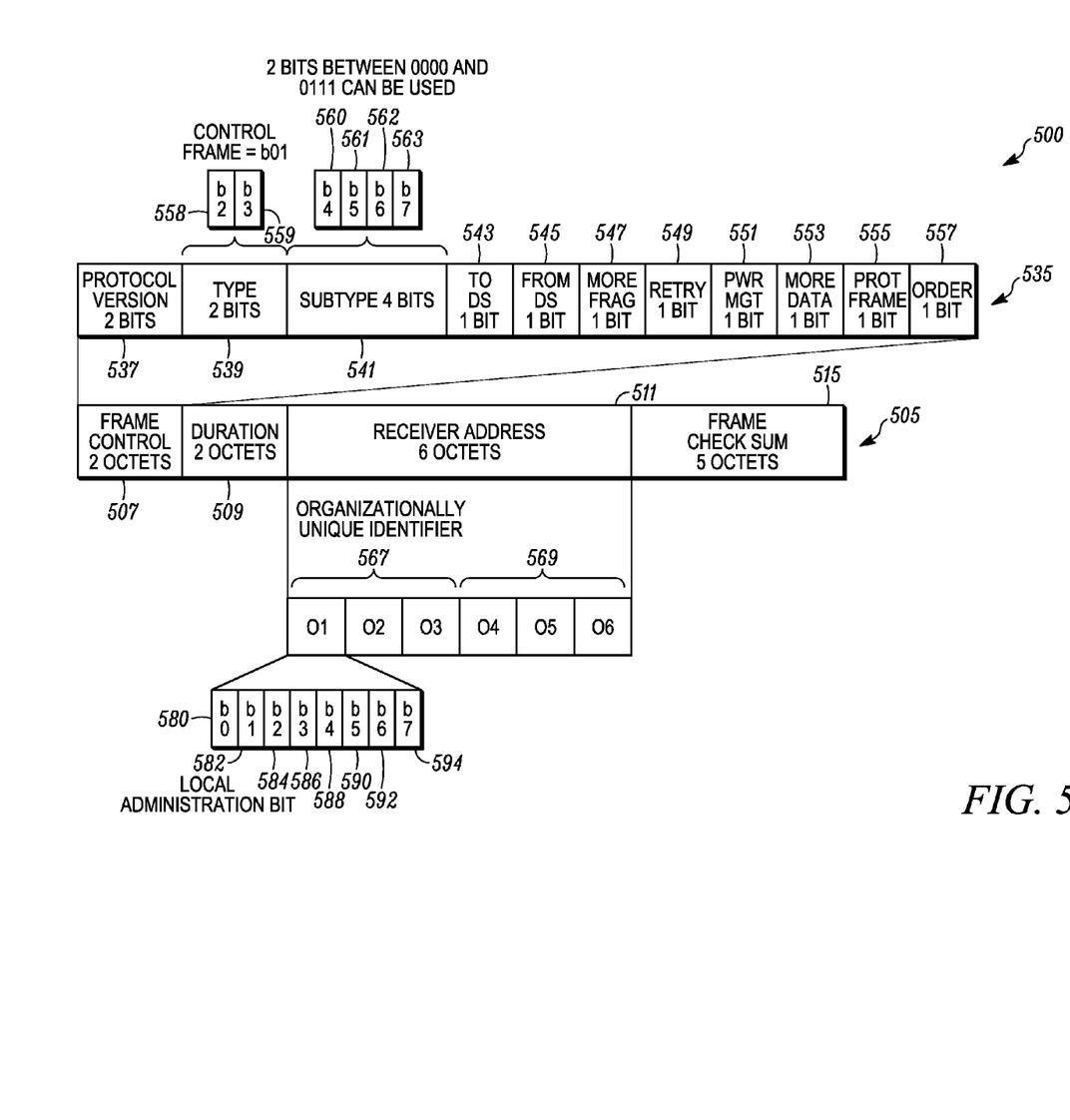
FIG. 5 is another exemplary frame structure of a Clear-to-Send (CTS) message according to one exemplary implementation of the present invention.

FIG. 5 is an exemplary frame structure of a Clear-to-Send (CTS) message 500 sent to a transmitter/source node 320 from a receiver/destination node 330 according to one exemplary implementation of the present invention. As shown in FIG. 5, the CTS message 500 comprises a number of fields 505. In this particular implementation, the fields 505 comprise a frame control field 507, duration field 509, receiver address field 511 and frame checksum field 515. The duration field 509 and the frame checksum field 515 each comprise sub-fields (not shown); however, these sub-fields are known in the art and will not be described in detail herein.

The frame control field 507 comprises a number of sub-fields 535. The sub-fields 535 comprise a protocol version sub-field 537, a type sub-field 539, a sub-type sub-field 541, and a number of other sub-fields 543-557. The sub-fields 537 and 543-557 are known in the art, for instance in the context of IEEE 802.11 standards, and will not be described in detail herein.

The frame control field 507 can be used to indicate either an acknowledgement message or a denial message from the receiver/destination node 330 to the transmitter/source node 320. The acknowledgement message confirms that the channel bandwidth requested by the transmitter/source node 320 can be used to transmit to the receiver/destination node 330. The denial message can be used to indicate that the channel bandwidth requested by the transmitter/source node 320 can not be used to transmit to the receiver/destination node 330. For example, setting a first bit in the frame control field 507 to the first value (e.g., logic 0 or 1) indicates that the transmitter/source node 320 denies the request of the transmitter/source node 320 to transmit the data packet over the wireless communication link at the default channel bandwidth, whereas setting the first bit in the frame control field to the second value (e.g., logic 1 or 0) indicates that the receiver/destination node 330 confirms that the transmitter/source node 320 can transmit the data packet over the wireless communication link at the requested channel bandwidth. As will be described in more detail below with respect to one exemplary implementation, four bits 560-563 (labeled as b4, b5, b6, b7) within the sub-type sub-field 541 can be used to acknowledge the request for the particular channel bandwidth.

For instance, two bits 558, 559 within the type sub-field 539 (labeled as b2, b3) are 0 and 1, respectively, to indicate that the frame 500 type is a control frame. Eight of the sixteen different combinations of the four bits 560-563 (labeled as b4, b5, b6, b7) within the sub-type sub-field 541 can be used to indicate the sub-type of the control frame 500 (e.g., 1011 is a RTS frame, 1100 is a CTS frame, 1101 is an acknowledgement (ACK) frame, etc.). In current IEEE 802.11 standards, the remaining eight of the bit combinations between 0000 and 0111 (e.g., 0000, 0001, 0010, 0100, 0011, 0101, 0110, 0111) are unassigned. The remaining eight of the bit combinations between 0000 and 0111 (e.g., 0000, 0001, 0010, 0100, 0011, 0101, 0110, 0111) can be used to acknowledge the request a particular channel bandwidth for a specific sub-type of control frame 500. For instance, if the frame sub-type indicates that the control frame 500 is a CTS type control frame, then another particular specialized value (e.g., 0100, 0011) of the four bits 560-563 (labeled as b4, b5, b6, b7) of the sub-type field 541 can be used to specify an increase or a decrease of the channel bandwidth of that CTS frame, whereas 1100 is used to specify the default channel bandwidth. If the frame sub-type indicates that the control frame 500 is an ACK type frame, then a yet another specialized particular value (e.g., 0101, 0110) of the four bits 560-463 (labeled as b4, b5, b6, b7) of the sub-type field 541 can be used to specify an increase or a decrease of the channel bandwidth of that ACK frame, whereas 1101 is used to specify the default channel bandwidth.

The receiver address field 511 comprises a number of octets O1-O6. The octets O1-O3 can be used to designate an organizationally unique identifier (OUID) 567 associated with the receiver node, whereas the octets O4-O6 can be used to designate a manufacturer identifier (MID) 569 associated with the receiver node. The first octet (O1) comprises eight bits 580-594 which are labeled b0-b7. In this example, bit b1 582 is referred to as a local administration bit (LAB). Octets O2 through O6 are known in the art and will not be described in detail herein.

The receiver address field 511 can be used to indicate an acknowledgement message or a denial message from the receiver/destination node 330 to the transmitter/source node 320. The acknowledgement message confirms that the channel bandwidth requested by the transmitter/source node 320 can be used to transmit to the receiver/destination node 330. The denial message indicates that the channel bandwidth requested by the transmitter/source node 320 can not be used to transmit to the receiver/destination node 330. In one exemplary implementation, the LAB 582 in the receiver address field 511 can have a first value or a second value. Setting the LAB 582 to the first value (e.g., denial message) indicates that the transmitter/source node 320 can not transmit the data packet over the wireless communication link at the requested channel bandwidth, whereas setting the LAB 582 to the second value (e.g., acknowledgement message) confirms that the transmitter/source node 320 can transmit the data packet over the wireless communication link at the requested channel bandwidth.

In one exemplary implementation, locally administered bit (LAB) 582 in the MAC address of the receiver/destination node 330 of the CLEAR-TO-SEND (CTS) message frame can be used to acknowledge (ACK) the channel bandwidth change down to a 5 MHz channel or up to a 20 MHz channel from the default 10 MHz channel operation. Setting the local administration bit (LAB) 582 to a logic 1 indicates that the request is preferred and subsequent requests are welcome, whereas setting the LAB 582 to a logic 0 indicates that subsequent requests are not welcome for a certain amount of time.

Figure 6:
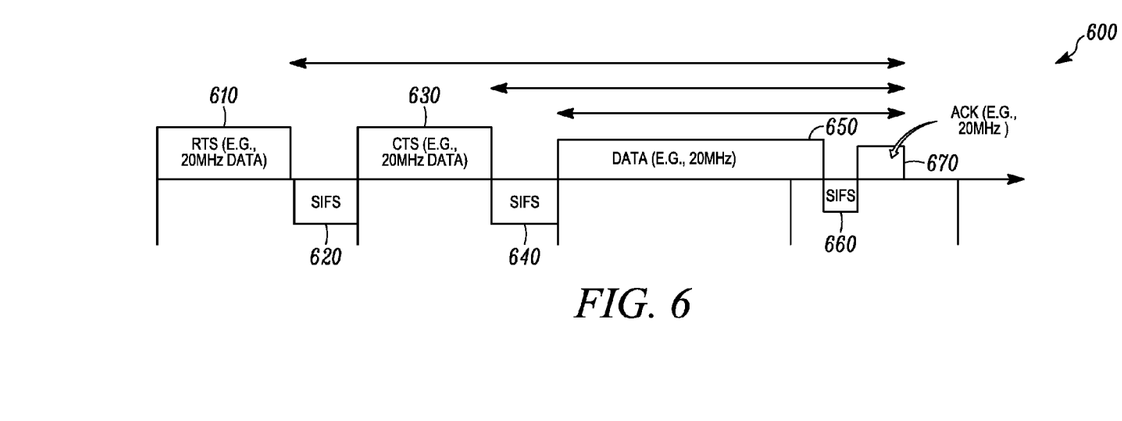
FIG. 6 is a timing diagram showing the timing of messages exchanged between a transmitter/source node and a receiver/destination node during a successful negotiation of a requested channel bandwidth according to one exemplary implementation of the present invention.
Figure 7:
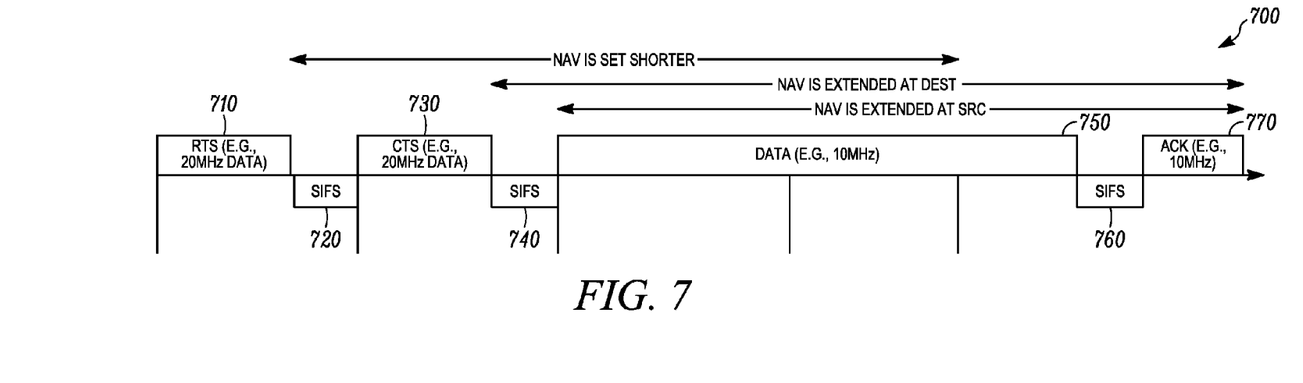
FIG. 7 is a timing diagram showing the timing of messages exchanged between a transmitter/source node and a receiver/destination node during a failed negotiation of a requested channel bandwidth according to one exemplary implementation of the present invention.

A description of example timings of the RTS message from the transmitter/source node 320, the CTS message from the receiver/destination node 330, the data transmission from transmitter/source node 320, and the acknowledgement (ACK) transmission from the receiver/destination node 330 will now be provided. The timing of the respective messages will be described in the event of a successful negotiation (FIG. 6) and in the event of a failed negotiation (FIG. 7).

A successful negotiation 600 indication will be the default mode of operation. If subsequent attempts are successfully negotiated but the data transaction fails, the rate selection algorithm should not choose the bandwidth anymore.

FIG. 6 is a timing diagram 600 showing the timing of messages exchanged between a transmitter/source node 320 and a receiver/destination node 330 during successful negotiation of a requested channel bandwidth according to one exemplary implementation of the present invention.

In this particular example, a transmitter/source node 320 sends a Request-to-Send (RTS) message 610 that includes a request for a higher channel bandwidth which is a 20 MHz channel bandwidth in this particular example. The transmitter/source node 320 transmits this RTS message 610 to a destination/receiver node 330 at a default channel bandwidth which in this particular example is a 10 MHz channel bandwidth. The transmitter/source node 320 sets its "duration" field in the packet to indicate the duration of the remaining transaction. In this particular example, the higher requested bandwidth is a 20 MHz channel bandwidth so the duration field would be set consistent with this bandwidth. The Network Allocation Vector (NAV) specifies a time period during which other nodes are prevented from accessing the wireless medium and causing contention. The NAV is an indicator of time periods when other nodes will not initiate transmission even though the nodes Clear Channel Assessment (CCA) function does not indicate traffic on the wireless medium. In the context of the IEEE 802.11e standard, the RTS message has a duration value. If NAV protection is desired for only the first or sole frame in the transmission opportunity (TXOP), the duration value is set to the time (in microseconds) required to transmit a pending data frame (or management frame), plus one Clear-To-Send (CTS) message frame, plus one ACK frame (if required), plus three SIFS intervals. If the calculated duration includes a fractional microsecond then the calculated duration value is rounded up to the next higher integer. If NAV protection is not desired, the duration value can be set to the remaining duration of the transmission opportunity (TXOP). Additionally, TxOPs are recommended to be for 1 packet duration and incrementally extended after the successful negotiation.

The transmitter/source node 320 will wait for a Short Inter-Frame Spacing (SIFS) period 620 for a response from the receiver/destination node 330. The SIFS is used to separate transmissions belonging to a single dialog, and is a time period during which the transmitter/source node 320 will be able to switch back to receive mode and decode a response packet from the receiver/destination node 330.

The receiver/destination node 330 receives the RTS message, eventually determines whether or not it will grant the transmitter/source node's 320 request to transmit at the higher channel bandwidth, and then sends a Clear-to-Send (CTS) message 630 to the transmitter/source node 320 at the default bandwidth. In a successful negotiation, the CTS message 630 includes an acknowledgement indicator indicating that the receiver/destination node 330 supports the transmitter/source node's 320 request to transmit at the higher bandwidth. The receiver/destination node 330 sets its NAV to support the higher bandwidth, and waits a SIFS period 640 for the transmitter/source node 320 to begin transmitting information 650 (e.g., a data packet) to the receiver/destination node 330. When the indicated duration in the CTS message 630 matches the requested duration in the RTS message 610, the SIFS after the CTS message 630 is the 10 MHz channel SIFS value. In the context of the IEEE 802.11e standard, a duration value of the CTS message is obtained from the duration field (e.g., as specified in the duration value 409 of FIG. 4 and/or the duration value 509 of FIG. 5) of the immediately previous RTS message frame, minus the time required to transmit the CTS message frame and its SIFS interval. The duration value reflects how long the rest of the transaction will take (e.g., packet length). If the calculated duration value includes a fractional microsecond, that value is rounded up to the next higher integer.

The transmitter/source node 320 transmits information 650 to the receiver/destination node 330 at the higher channel bandwidth and then waits for a higher channel bandwidth SIFS period 660 for the receiver/destination node 330 to transmit an acknowledge (ACK) message 670 indicating that the transmission from the transmitter/source node 320 was successful. The transmitter/source node 320 waits only for a higher channel bandwidth SIFS period 660 (as opposed to a default channel bandwidth SIFS period 620, 640) because the receiver/destination node 330 will be transmitting the acknowledge (ACK) message 670 at the higher channel bandwidth. When the duration value has been altered from the adjusted request, the SIFS period 660 after the DATA 650 transaction is the SIFS for the new channel bandwidth value. Otherwise it is the default channel bandwidth SIFS value.

The receiver/destination node 330 transmits the acknowledge (ACK) message 670 at the higher channel bandwidth. The transmitted ACK 670 bandwidth matches the transmitted data 650 bandwidth.

FIG. 7 is a timing diagram 700 showing the timing of messages exchanged between a transmitter/source node 330 and a receiver/destination node 320 during a failed negotiation of a requested channel bandwidth according to one exemplary implementation of the present invention. A negotiation can fail, for example, if the receiver/destination node 330 has a view of the delay spread profile (based on the channel quality as determined at the receiver/destination node 330) that the transmitter/source node 320 does not. A failed negotiation does not by itself indicate that the data transaction will not occur in the requested channel bandwidth; it only indicates that subsequent attempts at the bandwidth change are not favorable.

A transmitter/source node 320 sends a Request-to-Send (RTS) message 710 that includes a request for a higher channel bandwidth which is a 20 MHz channel bandwidth in this particular example. The transmitter/source node 320 transmits this RTS message 710 to a destination/receiver node 330 at a default bandwidth which is a 10 MHz channel bandwidth in this particular example. The transmitter/source node 320 sets its Network Allocation Vector (NAV) for the higher requested bandwidth. The transmitter/source node 320 will wait for a Short Inter-Frame Spacing (SIFS) period 720 for a response from the receiver/destination node 330.

The receiver/destination node 330 receives the RTS message, eventually determines whether or not it will grant the transmitter/source node's 320 request to transmit at the higher channel bandwidth, and then sends a Clear-to-Send (CTS) message 730 to the transmitter/source node 320 at the default channel bandwidth. In an unsuccessful or failed negotiation, the CTS message 730 includes a denial indicator indicating that the receiver/destination node 330 does not support the transmitter/source node's 320 request to transmit at the higher channel bandwidth. The receiver/destination node 330 sets its NAV to support the default bandwidth, and waits a SIFS period 740 for the transmitter/source node 320 to begin transmitting information 750 (e.g., a data packet) to the receiver/destination node 330. Upon reception of the CTS message 730, the transmitter/source node 320 resets the value for the "duration" field to reflect the duration of the remaining transaction. In this particular example, the default channel bandwidth is a 10 MHz channel bandwidth so the duration field would be set consistent with this bandwidth.

In the failed negotiation case, the duration value indicated in the CTS message is equal to the default SIFS+(2× requested data duration)+default SIFS+default ACK for a failed 20 MHz channel bandwidth request, and is equal to the default SIFS+½ requested data duration+margin+default SIFS+default ACK for a failed 5 MHz channel bandwidth request. The margin is used to accommodate for extra time required for 1 discrete rate increase (to overcome the 3 dB loss).

The transmitter/source node 320 transmits information 750 to the receiver/destination node 330 at the default channel bandwidth and then waits for a full SIFS period 760 for the receiver/destination node 330 to transmit an acknowledge (ACK) message 770 indicating that the transmission from the transmitter/source node 320 was successful. The receiver/destination node 330 transmits the acknowledge (ACK) message 670 at the default channel bandwidth. The transmitter/source node 320 waits for a full SIFS period 760 (as opposed to a higher channel bandwidth SIFS period 660) because the receiver/destination node 330 will be transmitting the acknowledge (ACK) message 770 at the normal default channel bandwidth.

Optionally if the destination node wishes for the access to occur in the default bandwidth for the current access attempt then the duration value may be shortened or extended to indicate this. This extra mechanism will require very tight modem integration or parallel modem processing paths for the frame to be presented to the air interface in time for the channel access opportunity. The default negotiation failure mode of operation is to transmit the data/ACK exchange using the requested bandwidth and use the bit in the CTS message to ask that the modified channel bandwidth not be used for a given time period.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of dynamically selecting one of a default channel bandwidth and an alternate channel bandwidth for transmitting information over a wireless communication link which couples a transmitter node, designed to transmit at the default channel bandwidth and the alternate channel bandwidth, to a receiver node, designed to receive at the default channel bandwidth and the alternate channel bandwidth, the method comprising:

transmitting, from the transmitter node to the receiver node, a request message at the default channel bandwidth comprising a requested channel bandwidth which the transmitter node requests to use for transmitting the information to the receiver node, wherein the requested channel bandwidth comprises one of the default channel bandwidth and the alternate channel bandwidth;

changing a transmission bandwidth at which the transmitter node is transmitting from the default channel bandwidth to the requested channel bandwidth within a first Short InterFrame Spacing period when the requested channel bandwidth is different from the default channel bandwidth after the transmitter node transmits the request message;

transmitting, from the receiver node to the transmitter node responsive to the request message, a response message at the default channel bandwidth comprising an acknowledgement indicator when the channel bandwidth requested by the transmitter node is available to transmit the information to the receiver node;

transmitting, from the receiver node to the transmitter node responsive to the request message, a response message at the default channel bandwidth comprising a denial indicator when the channel bandwidth requested by the transmitter node is not available to transmit the information to the receiver node; and changing the transmission bandwidth at which the transmitter node is transmitting from the requested channel bandwidth to the default channel bandwidth within a second Short InterFrame Spacing period when the denial indicator is received at the transmitter node.

2. A method according to claim 1, further comprising:

transmitting a capability message from the transmitter node and the receiver node to other nodes, wherein the capability message comprises a multi-channel bandwidth information element (IE) which indicates that the transmitter node and the receiver node are designed to transmit/receive at either of the default channel bandwidth and the alternate channel bandwidth.

3. A method according to claim 1, wherein the request message further comprises:

a transmitter address field comprising a transmitter identifier unique to the transmitter node; and a receiver address field comprising a receiver identifier unique to the receiver node, wherein the transmitter and receiver identifiers are used to indicate a particular channel bandwidth being requested by the transmitter node.

4. A method according to claim 3, wherein the request message further comprises a frame control field used to indicate that the request message is a control frame, that the type of control message is the request message, and a particular channel bandwidth being requested by the transmitter node.

5. A method according to claim 1, wherein the response message further comprises:

a receiver address field comprising a receiver identifier unique to the receiver node, the receiver identifier comprising the acknowledgement or denial indicator.

6. A method according to claim 5, wherein the response message further comprises a frame control field used to indicate that the response message is a control frame, that the type of control message is the response message, and the acknowledgement or denial indicator.

7. A method according to claim 1, wherein the request message further comprises:

a frame control field used to indicate that the request message is a control frame, that the type of control message is the request message, and a particular channel bandwidth being requested by the transmitter node.

8. A method according to claim 7, wherein the frame control field comprises a type field of first bits indicating that the request message is the control frame and a sub-type field of second bits different from the first bits and indicating that the type of control message is the request message and the particular channel bandwidth being requested by the transmitter node, and the frame control field follows a standard protocol in which the second bits have a number of assigned states smaller than the number of states able to be taken by the second bits, the method further comprising using unassigned states of the second bits according to the standard protocol to indicate that the type of control message is the request message and the particular channel bandwidth is different from the default bandwidth.

9. A method according to claim 8, wherein states of a particular sub-type field of a particular transmission indicate whether the particular transmission is a request-to-send message, a clear-to-send message, or an acknowledgement message.

10. A method according to claim 1, wherein the response message further comprises:

a frame control field used to indicate that the response message is a control frame, that the type of control message is the response message, and the acknowledgement or denial indicator.

11. A method according to claim 1, wherein the alternate channel bandwidth comprises at least one of a higher channel bandwidth and a lower channel bandwidth, and further comprising:

determining quality of the communication link at the transmitter node;

selecting the requested channel bandwidth based on the quality of the communication link determined at the transmitter node, wherein the requested channel bandwidth comprises the highest channel bandwidth that is supported based on the quality of the communication link determined at the transmitter node; and generating the request message to specify the selected one of the default, higher and lower channel bandwidths.

12. A method according to claim 11, wherein the alternate channel bandwidth comprises at least one of a higher channel bandwidth and a lower channel bandwidth, and further comprising:

determining quality of the communication link at the receiver node;
 determining whether the requested channel bandwidth requested by the transmitter node is supported based on the quality of the communication link determined at the receiver node; and
 generating the response message, based on the quality of the communication link determined at the receiver node, to indicate whether the quality of the communication link determined at the receiver node supports the requested channel bandwidth, wherein the response message specifies the highest one of the default, higher and lower channel bandwidths that is supported by the quality of the communication link determined at the receiver node.

13. A method according to claim 1, wherein the request message is a request-to-send message and the response message is a clear-to-send message.

14. A method according to claim 1, further comprising permitting the transmitter to change the requested channel bandwidth in successive frames.

15. A method according to claim 1, further comprising maintaining, at the transmitter node, the transmission bandwidth at the alternate channel bandwidth when the acknowledgment indicator is received at the transmitter node even if a subsequent data transaction fails.

16. A method according to claim 1, further comprising altering a duration of a Short InterFrame Spacing period between transmissions between the transmitter node and the receiver node after the response message has been received when the acknowledgement indicator is transmitted and the transmission bandwidth is the alternate channel bandwidth.

17. A method of dynamically selecting a transmission bandwidth for transmitting information over a wireless communication link between a transmitter and a receiver, the method comprising:

transmitting a request-to-send (RTS) message from the transmitter to the receiver at a default channel bandwidth, the RTS message including:
 a control field having a type field indicating that the RTS message is a control frame and a sub-type field indicating that the type of control message is the RTS message, and
 transmitter and receiver address fields respectively having a transmitter and receiver identifier unique to the transmitter and receiver,
 at least one of the sub-type field or a combination of the transmitter and receiver identifiers containing a requested bandwidth which the transmitter requests to use for transmitting the information to the receiver, wherein the requested bandwidth comprises one of the default channel bandwidth and an alternate channel bandwidth; changing a transmission bandwidth at which the transmitter is transmitting from the default channel bandwidth to the requested bandwidth within a first Short InterFrame Spacing period when the requested bandwidth is different from the default channel bandwidth after the transmitter transmits the RTS message;
 transmitting a clear-to-send (CTS) message from the receiver to the transmitter at the default bandwidth, the CTS message responsive to the RTS message and containing:
 a frame control field having a type field indicating that the CTS message is a control frame and a sub-type field indicating that the type of control message is the CTS message, and
 a receiver address field having a receiver identifier unique to the receiver, at least one of the sub-type field or the receiver identifier including an acknowledgement or denial indicator respectively confirming or denying use by the transmitter of the requested bandwidth, and
 changing the transmission bandwidth at which the transmitter is transmitting from the requested bandwidth to the default channel bandwidth within a second Short InterFrame Spacing period when the denial indicator is received at the transmitter.

18. A method according to claim 17, wherein both the sub-type field and the transmitter and receiver identifiers contain the requested bandwidth.

19. A method according to claim 17, wherein both the sub-type field and the receiver identifier contain the acknowledgement or denial indicator.

20. A method according to claim 17, wherein the frame control field of each of the RTS and CTS messages follows a standard protocol it which the sub-type field has a number of assigned states smaller than the number of states able to be taken, the method further comprising using unassigned states according to the standard protocol to indicate the type of control message and that the requested bandwidth is different from the default channel bandwidth.

21. A method according to claim 17, further comprising altering a duration of a Short InterFrame Spacing period between transmissions between the transmitter and the receiver after the CTS message has been received when the acknowledgement indicator is transmitted and the requested bandwidth different from the default channel bandwidth.

* * * * *

UNITED STATES PATENT AND TRADEMARK OFFICE
CERTIFICATE OF CORRECTION

| | | |
|---|---|---|
| PATENT NO. | : 7,796,632 B2 | Page 1 of 1 |
| APPLICATION NO. | : 11/537093 | |
| DATED | : September 14, 2010 | |
| INVENTOR(S) | : Hasty et al. | |

It is certified that error appears in the above-identified patent and that said Letters Patent is hereby corrected as shown below:

In Column 10, Line 40, delete "As these" and insert -- as these --, therefor.

In Column 11, Line 39, insert -- The receiver address field 411 comprises a number of octets O1-O6. The octets O1-O3 can be used to designate an organizationally unique identifier (OUID) 467 associated with the receiver node, whereas the octets O4-O6 can be used to designate a manufacturer identifier (MID) 469 associated with the receiver node. The first octet (O1) comprises eight bits 476-483 which are labeled b0-b7. In this example, bit b1 477 is referred to as a local administration bit (LAB). Octets O2 through O6 are known in the art and will not be described in detail herein. --, as a new paragraph.

In Column 15, Line 1, delete "TxOPs" and insert -- TXOPs --, therefor.

In Column 20, Line 39, in Claim 20, delete "it which" and insert -- in which --, therefor.

Signed and Sealed this
Thirty-first Day of July, 2012

David J. Kappos
*Director of the United States Patent and Trademark Office*